July 18, 1933.  H. LAMBERT  1,918,919
PEDAL PAD
Filed Nov. 23, 1932   2 Sheets-Sheet 2
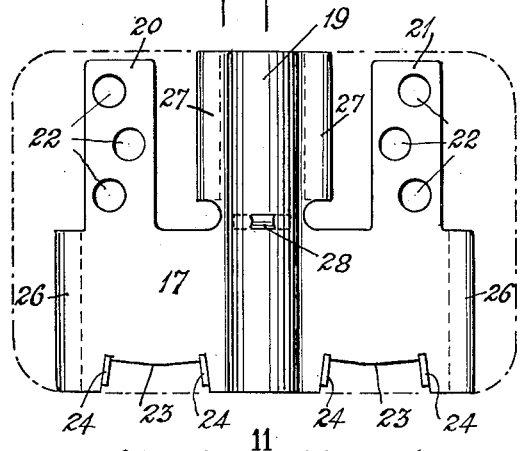
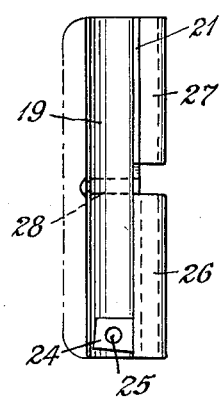
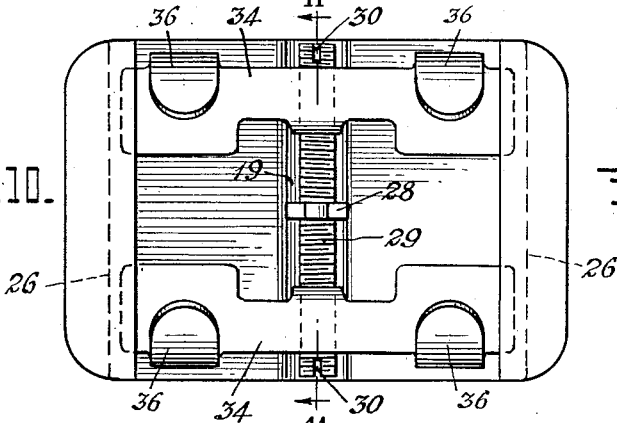
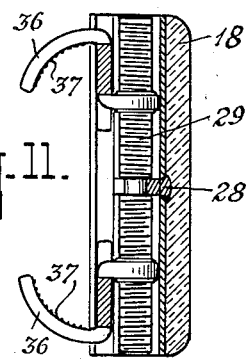
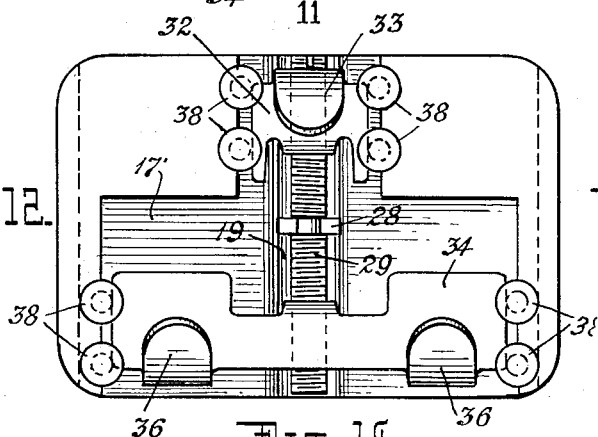
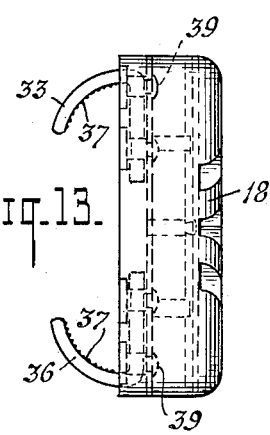
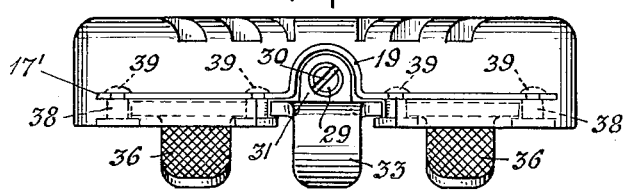
INVENTOR
HERBERT LAMBERT
BY
ATTORNEY Patented July 18, 1933

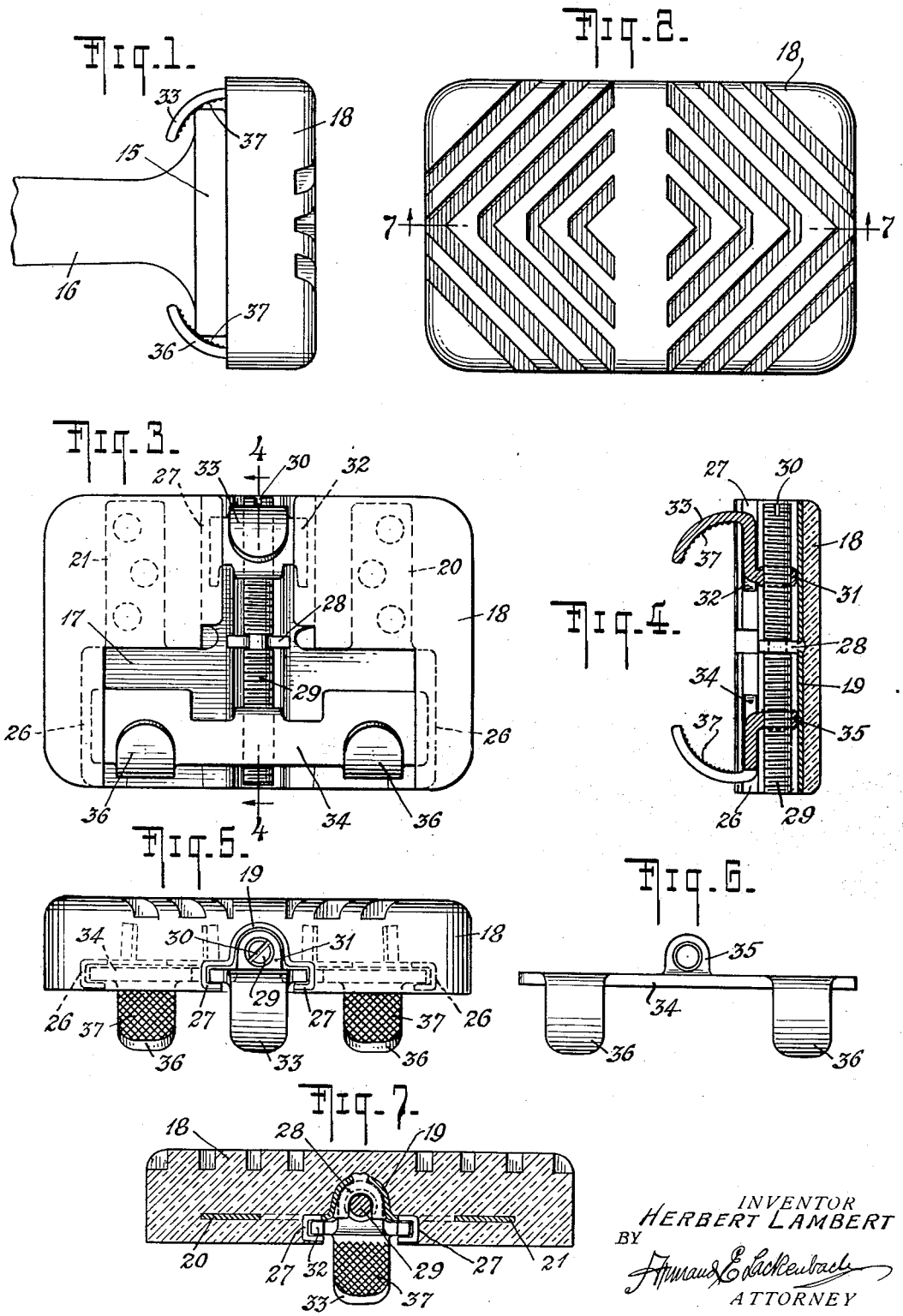

1,918,919

UNITED STATES PATENT OFFICE

HERBERT LAMBERT, OF BROOKLYN, NEW YORK, ASSIGNOR TO KASTAR SPECIALTY MFG. CO., INC., OF NEW YORK, N. Y., A CORPORATION OF NEW YORK

PEDAL PAD

Application filed November 23, 1932. Serial No. 644,001.

My invention relates to a foot pedal attachment familiarly known as a pedal pad and more particularly to a pedal pad supporting device capable of application to foot pedals of any size, configuration, or construction with a single operative adjustment. While my novel adjustable pedal pad may be applied to a pedal tread of any apparatus having a foot pedal, its most extensive use is indicated in an automotive vehicle and more particularly in connection with the clutch and brake pedal devices thereof.

An object of my invention is to provide a foot pedal attachment or pad, having a face, for instance, of rubber, the device being constructed so that it may be applied to a pedal tread of any size by means of a single tool operative to clamp the pedal pad on the pedal tread. The devices of the prior art are capable of attachment to a pedal tread of a particular size, for instance, the tread of the pedal of the clutch or brake of a particular make of automotive vehicle. For this reason, therefore, if the pad of a clutch or brake pedal of a particular make of car is worn, so that it is necessary to replace the same with a new pad, the owner of the car is required to purchase a pedal attachment or a pedal pad which has been expressly manufactured for the particular make of car which he owns. He is thus obliged to order the pedal attachment from a dealer supplying accessories for the particular make of car and once he has bought such attachment, he can attach it only to the particular foot pedal for which it has been designed. While so-called "Universal" pedal pads for the solution of this problem are now available on the market, such "Universal" pedal pads require three separate adjusting operations to clamp the pedal pad upon the pedal tread. Furthermore, the construction of such pedal pads as are now on the market is complicated and they are not easily applied to a clutch or brake pedal by reason of the fact that a separate adjustment for each of the several clamping elements must necessarily be made in order to clamp the pad into position.

My invention contemplates the provision of a foot pedal pad of simple construction, capable of easy attachment, necessitating but a single adjustment in order to move the clamping elements thereof into clamping engagement with the pedal to which the pad is to be applied. The structure of my novel pedal pad includes movable clamping jaws which may be applied to the foot pedal tread for the purpose of securing the device thereto, the movable clamping jaws making possible the attachment of the foot pedal device by a single adjusting operation while at the same time having the pedal pad fit a tread of any size, configuration, or construction. My invention resides more particularly in the construction of my novel pedal pad device and in the various features thereof adapting it for adjustment for clamping engagement with the foot pedal tread of any ordinary motor vehicle or machine structure by a single adjusting operation.

More specific objects of my invention will be apparent from a description of the specific embodiments of my device illustrated in the accompanying drawings in which the various forms of the invention are shown by way of illustration rather than by limitation.

In such drawings, Fig. 1 is a side view of my novel pedal pad showing the manner of its attachment to the foot pedal tread; Fig. 2 is a plan view of my device showing the rubber face attached thereto; Fig. 3 is a bottom plan view of the pedal pad; Fig. 4 is a section along line 4—4 of Fig. 3; Fig. 5 is a side ivew of the device; Fig. 6 is a side view of one of the clamping elements of the pedal pad; Fig. 7 is a section on the line 7—7 of Fig. 2; Fig. 8 is a plan view of the support showing the rubber pad in dotted outline; Fig. 9 is a side view of the support; Fig. 10 is a plan view of a modified form of the device having four clamping jaws instead of three; Fig. 11 is a section along the line 11—11 of Fig. 10; Fig. 12 is a bottom plan view of a modified from of the device showing a modification of the support; Fig. 13 is an end view of the modified form of the device; and Fig. 14 is a side view of such modified form.

Referring more specifically to the drawings in which similar reference characters identify similar parts in the several views, 15 is the tread provided at the end of the stem 16 of a clutch or brake mechanism, for instance, of an automotive vehicle to which my novel pedal pad is adapted to be attached. The tread 11 may be either of rectangular or oval construction, my attachment being equally applicable to either of these two types of foot pedal treads.

My novel foot pedal pad comprises a support 17 which is embedded in a cushioning pad 18 of a resilient material, for instance, rubber. The support 17 may be made of pressed steel or other suitable material shaped to provide a channel 19 running throughout the center thereof laterally of the support. Projections 20, 21, having apertures 22 therein extend from the body of the support near the ends thereof whereby a firm moulding of the support within the rubber cushioning pad 18 is effected. For the same purpose, i. e., to obtain a more effective moulding of the cushioning pad upon the support, the support is provided along its longest edge with cut-outs 23, 23, the material of the support being bent upwardly as at 24, 24 to provide firmer engagement of the support by the cushioning pad. The projections 24 may be provided with apertures 25 for a more secure anchoring of the rubber cushioning pad upon the support.

The ends of the support 17 are bent first downwardly and then inwardly to form raceways 26, 26 (see Fig. 5), the laterally extending portions of the support 17 adjacent the channel 19 being likewise turned downwardly and inwardly to form raceways 27, 27.

Midway the length of the channel 19 is provided a seat 28 which may be soldered to the support, supporting, by means of a peripheral groove, an operator comprising a stud 29 one-half of which extending upon one side of the seat 28 being threaded in one direction and the other half of which, extending on the other side of seat 28, being threaded in the opposite direction. The stud 29 is provided, preferably at both ends, with slots 30, 30 adapted to receive the end of a screw driver or similar implement for effecting rotation of the stud 29.

Threaded upon the stud 29 by means of a tongue 31 is a jaw carrying member 32 having projection 33 bent upwardly to form a jaw. The jaw carrying member 32 and its integral jaw 33 are mounted, by means of tongue 31, for movement upon one end of the threaded stud 29. On the other end of the threaded stud 29 is mounted for movement thereon a jaw carrying member 34 having tongue 35 thereof in engagement with the stud 29, the tongue 35 being internally threaded so that a rotation of the stud 29 will cause the jaw carrying member 34 to move longitudinally along the stud. The member 34 carries near its end, jaw members 36, 36.

It will be noted from an inspection of Figs. 3 and 4 that as the stud 29 is rotated by means of a screw driver or similar tool, the end of which is inserted into the slot 30, the jaw carrying members 32 and 34 will be moved toward or away from each other, depending upon the direction of rotation of this stud, such jaw carrying members riding in the raceways 17 and 26, respectively, so that a positive movement, without wobbling, of the jaw carrying members, as the stud is rotated, will be effected.

In the application of my novel pedal pad to a pedal tread the stud 29 is first rotated so as to cause the jaws 33 and 36, carried by members 32 and 34, to move away from each other a sufficient distance to enable the person applying the pad to place the same over the pedal tread 15 and then the stud 29, by a single operation of turning the same in the opposite direction, will cause the jaws 33 and 36 to clamp the pedal tread 15 between them. In order to obtain an absolutely firm clamping of the pedal pad upon the tread, the inner faces of the jaws 33 and 36 may be provided, as shown in Figs. 1, 4 and 5, with an irregular or cross-hatched surface 37, which will prevent slippage of the jaws out of their secure engagement with the corners of the pedal tread. In place of the cross-hatched inner surface of the clamping jaws 33 and 36, any positive friction surface may be employed.

In Figs. 10 and 11, I have shown a slightly modified form of my novel pedal pad in which both sides of the pedal pad are provided with jaw carrying members having two jaw elements. While I have found in practice, that the construction illustrated in Figs. 1 to 9, results in a firm clamping of the pedal pad to the tread, I have shown the modified form as obviously within the ambit of my invention.

The embodiment of my invention illustrated in Figs. 12 to 14 differs from the preferred form hereinabove described in that instead of the support 17' being provided with raceways similar to 26 and 27 in which the jaw carriers 32 and 34 may slide, I have provided a plurality of rivets 38, 38 distributed in pairs in place of such raceways, the heads 39, 39 of such rivets providing upper limiting surfaces in the nature of raceways. I have found that two such rivets in place of each of the raceways 26 and 27 may be employed and will result in a construction having all of the advantages of the preferred form, the cost of such modified form, however, being somewhat less than that of such preferred form.

While I have described specific embodiments of my invention, it is obvious that various modifications therein, particularly in the arrangement and construction of the several parts thereof, may be made without departing from my invention.

I claim:

1. A pedal pad comprising in combination a support, a facing of a resilient material secured thereon, a member movable transversely of the support and carrying a clamping jaw, a second member movable transversely of said support and carrying a pair of clamping jaws, and an operator for simultaneously moving said members and the clamping jaws carried thereby toward and away from each other by a unitary operating movement of said operator, said support being provided with means, independent of said operator, for positively guiding the ends and the intermediate portions of the members carrying the clamping jaws.

2. A pedal pad comprising in combination a support, a facing of a resilient material secured thereon, a member movable transversely of the support and carrying a clamping jaw, a second member movable transversely of said support and carrying a pair of clamping jaws, and an operator, comprising a stud threaded in one direction along substantially half its length and in the opposite direction along the remainder of its length, for moving said members and the clamping jaws carried thereby toward and away from each other by a unitary operating movement of said operator, said support being provided with means, independent of said operator, for positively guiding the ends and the intermediate portions of the members carrying the clamping jaws.

3. A pedal pad comprising in combination a support, a facing of a resilient material secured thereon, an operator comprising a stud carried on said support, a member movable along said stud and carrying a clamping jaw, and a second member movable along said stud in the opposite direction and carrying a pair of clamping jaws, whereby the pedal pad may be secured to a pedal tread by the rotation of the stud to bring said jaws simultaneously into clamping engagement with the sides of the pedal tread, said support being provided with means, independent of said operator, for positively guiding the ends and the intermediate portions of the members carrying the clamping jaws.

4. A pedal pad comprising a resilient cushioning pad, a support therefor embedded within said pad, said support having a depressed channel running centrally and laterally of said support, an operator comprising a stud secured within said channel and having one half thereof threaded in one direction and the other half thereof threaded in the opposite direction, a carrier secured upon said stud for movement along one half thereof, a jaw member extending from said carrier, a second carrier mounted upon the other half of said stud, a pair of jaw members extending from said second carrier, and raceways formed by the ends of said support within which said carriers are adapted to slide, said stud being rotatable to move said carriers and the jaw members carried thereby toward and away from each other simultaneously.

5. A pedal pad comprising a resilient cushioning pad, a support therefor embedded within said pad, an operator comprising a rotatable stud mounted on said support centrally and laterally thereof and having one half of its length threaded in one direction and the other half in the opposite direction, a carrier mounted upon said stud for movement along one half thereof, a jaw extending from said carrier, a second carrier mounted upon the other half of said stud, a pair of jaws extending from said second carrier, and raceways formed by the ends of said support within which said carriers are adapted to slide, whereby a single rotative movement of said stud serves to move said carriers and the jaws carried thereby toward or away from each other simultaneously.

6. A pedal pad comprising a resilient cushioning pad, a support therefor embedded within said pad, an operator comprising a stud mounted on said support and having a portion thereof threaded in one direction and another in the opposite direction, a jaw carrying member secured upon said stud for movement longitudinally thereof on the first mentioned portion, a jaw extending from said member, a second jaw carrying member mounted on said support and secured upon said stud for movement longitudinally thereof on the second portion of said stud, and a pair of jaws extending from said second member, said jaws being adapted to be moved toward and away from each other by the rotation of said stud.

HERBERT LAMBERT.